Jan. 11, 1927.

F. FABER

DYNAMOMETER

Filed Jan. 16, 1926    2 Sheets-Sheet 1

1,614,354

Franz Faber
INVENTOR

BY Victor J. Evans
ATTORNEY

Jan. 11, 1927. 1,614,354
F. FABER
DYNAMOMETER
Filed Jan. 16, 1926 2 Sheets-Sheet 2
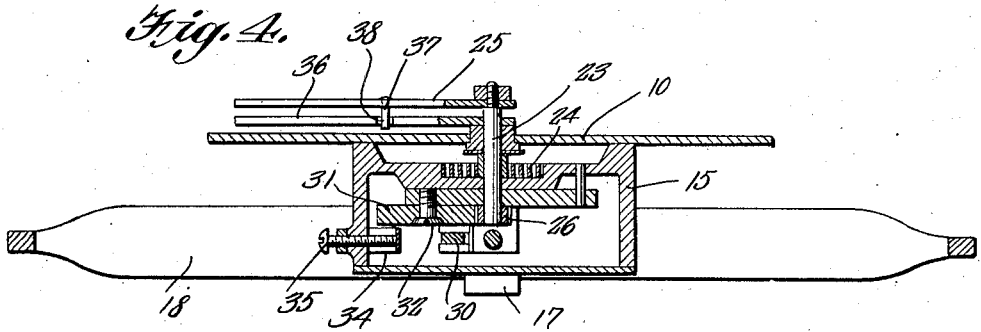
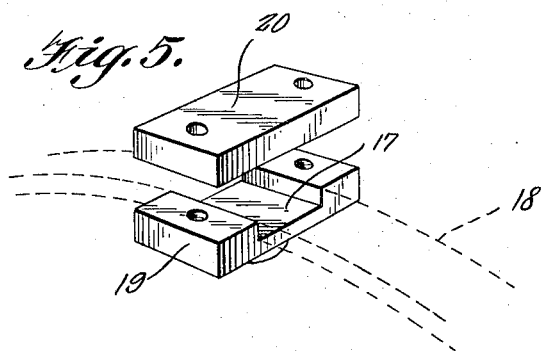
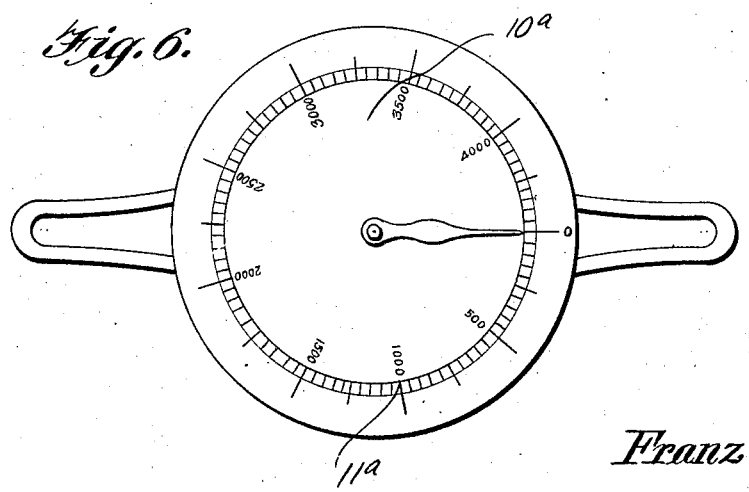
Franz Faber
INVENTOR
BY Victor J. Evans
ATTORNEY Patented Jan. 11, 1927.

1,614,354

UNITED STATES PATENT OFFICE.

FRANZ FABER, OF JERSEY CITY, NEW JERSEY.

DYNAMOMETER.

Application filed January 16, 1926. Serial No. 81,848.

This invention relates to improvements in dynamometers or weighing or testing devices.

The principal object of the invention resides in a device for determining the pulling power of vehicles to test the tensile strength of a cable, chain, rope or the like, and which may also be used for measuring the pushing force of the hands of a person.

Another object is to provide a dynamometer in which the parts are so constructed and arranged, that they are capable of withstanding shock or recoil after the sudden breaking of a cable or the like being tested.

A further object of the invention is to provide a dynamometer having a dial calibrated to indicate both the amount of strength produced by a pulling force and the amount of strength produced by a pushing force either of which might be applied thereto.

A still further object is the provision of a dynamometer including an elliptical spring which is mounted in such a manner with respect to the dial and casing as not to require holes to be drilled therein, which holes tend to weaken the spring member and subject the same to easy breaking at its points of connection.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 4 is a horizontal sectional view on the line 4—4 of Figure 2.

Figure 5 is a detail perspective view of one of the shackles.

Figure 6 is a front elevation of a modified form of my invention.

Figure 1:
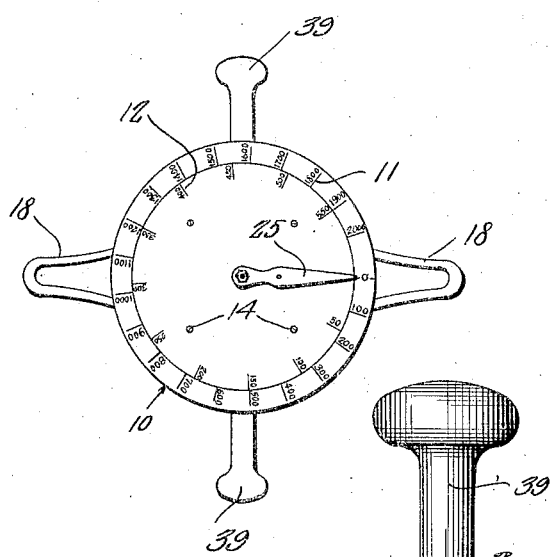
Figure 1 is a front elevation of my improved dynamometer.
Figure 3:
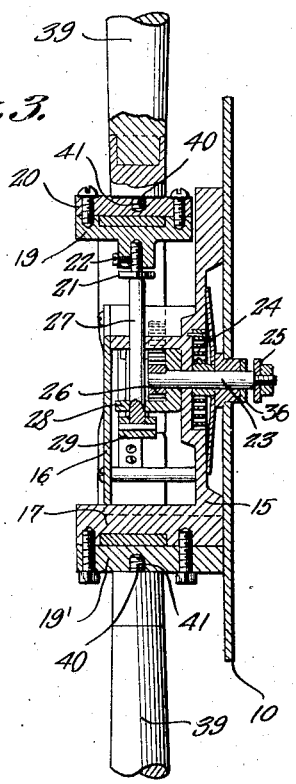
Figure 3 is a vertical transverse sectional view on the line 3—3 of Figure 2.
Figure 2:
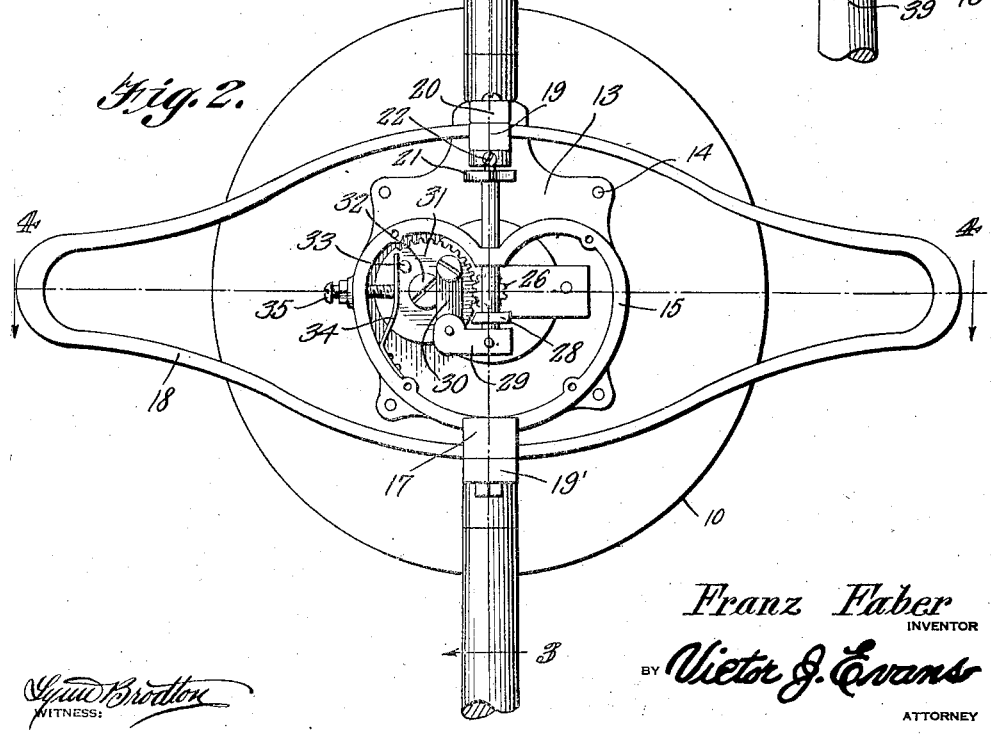
Figure 2 is a rear elevation of the same with the back plate removed.

Referring more particularly to the drawings, the reference numeral 10 designates a dial plate which is calibrated to provide a set of graduations 11 for indicating the tensile strength or pull, and a set of graduations 12 for indicating the force of push applied to the device at right angle to the direction of the force necessary to measure the tensile strength of an object such as a vehicle, chain, rope or cable. An attaching plate 13 is supported upon the back of the plate 10 by screws or the like fastening elements 14, and which plate supports a casing 15 having a removable cover plate 16 to permit access to the working parts contained within the casing and which will now be described.

The casing 15 is provided with a boss having a recess 17 of a width and depth to seat one of the bowed sides of an elliptical spring member 18. A plate 19' is bolted to the casing and overlies the recess to keep the spring seated or anchored against movement with respect thereto. This side of the spring is stationarily mounted while the opposite side is adapted to move to a compressed position when the device is in use for testing purposes. A shackle 19 is attached to the opposite bowed side of the spring by a plate 20 which is secured thereto by bolts, but which bolts do not pass through the spring but to one side of the same. The shackle 19 carries a stop member 21 which is threaded to the shackle for adjustment and the same is held in a locked position after the adjustment by means of a set screw 22 which passes through the collar formed on the underside of the shackle and is threaded therewith. By anchoring one of the sides of the spring to the casing and by mounting the stop of the opposite side in the manner shown, does not in any way tend to weaken the spring as no holes are drilled in the spring for fastening the elements to pass. Heretofore, in devices of this kind it has been the practice to pass bolts directly through the sides of the spring member which results in breakage of the spring member when great pressure is placed thereon.

Passing centrally through the disk or plate 10 is a shaft 23 held under tension by a coil spring 24. The outer end of the shaft carries a pointer 25 which is fixed thereto, while the other end of the shaft extends into the casing and has a pinion 26 fixed thereon. A plunger rod 27 is slidably mounted in one of the walls of the casing and in a bearing 28, and the outer end of the plunger rod normally engages the stop member 21. The inner end of the plunger rod carries an arm 29, to which one end of a link 30 is pivotally connected. The other end of the link is eccentrically connected with the gear segment 31 which is rotatable on a stub shaft 32 The pinion 26 meshes with the segment and places the segment under tension by reason of the spring 24. A pin 33 extends from the gear segment and engages the free end of a flat spring 34 which acts as a stop for limiting the backward movement of the segment against the action of the coil spring 24. The flat spring 34 is held in an adjusted position by a set screw 35 which is threaded in the casing and by adjusting the same, the pointer may be made to register with the zero mark on the dial plate so as to always keep the parts in an accurate position.

A second pointer 36 is loosely mounted on the shaft 23 and normally underlies the pointer 25, which latter pointer carries a pin 37 extended from its underside and which passes through a slot 38 in the pointer 36. When the pointer 25 moves about the dial by reason of the compression of the spring 18, the same carries the pointer 36 along with it, and when pressure is released from the elliptical spring, the coil spring 24 automatically returns the pointer 25 to normal position but which leaves the pointer 36 at the farthest point reached in its movement to indicate the exact pressure applied to the spring member.

For testing the tensile strength of a cable, chain or the like, one end of the same is attached to one of the ends of the elliptical spring member, while a pulling force is attached to the opposite end. As the force is applied, the loose side of the spring is caused to compress and move toward the opposite side, and in doing so the stop member 21 presses down upon the plunger which moves the arm 29 downward and pulls the segment 31 about its shaft to impart rotation to the shaft 23 through the pinion 26 and against the action of the coil spring 24. Should the part being tested suddenly break, the pointer 25 will automatically return to zero as the elliptical spring 18 will return to normal position, leaving the pointer 36 in an indicating position as previously mentioned.

For testing a pushing force, I provide hand grips 39 having threaded studs 40 which screw into threaded openings 41 in the plates 19 and 20. In use, the operator takes hold of the hand grips 39 and imparts a pressing force thereto, which causes the actuation of the parts in the manner already explained. However, instead of reading the dial as before, the pointer co-acts with the inner set of graduations 12, the respective sets of graduations are calibrated in accordance with the tension of the elliptical spring and it will be noted that the sets are different, as it takes a greater pulling force to move the pointer a predetermined distance, than it would take a pushing force to move the pointer a corresponding distance.

By providing hand grips on the spring member, it will be appreciated that the device will be found useful in athletic clubs in testing the pushing strength of a pair of human hands.

In Figure 6 of the drawings, I have shown a slightly modified form wherein the dial $10^a$ is provided with a single set of graduations $11^a$, as this device is only intended for measuring a tensile force. In this form hand grips are omitted.

What is claimed as new is:—

1. In a dynamometer, the combination of an elliptical spring member, a dial plate having sets of graduations thereon, one set calibrated to indicate a pulling force and the other set calibrated to indicate a pushing force, a pointer common to both of said sets of graduations, and means connecting said spring member and pointer operable by a pulling force applied to the ends of said spring member or a pushing force applied to the sides of said spring member for actuating said pointer for co-action with the respective sets of graduations for indicating the amount of said forces.

2. In a dynamometer, the combination of an elliptical spring member, a dial plate having sets of graduations thereon, one set calibrated to indicate a pulling force and the other set calibrated to indicate a pushing force, a pointer common to both of said sets of graduations, and means connecting said spring member and pointer operable by a pulling force applied to the ends of said spring member or a pushing force applied to the sides of said spring member for actuating said pointer for co-action with the respective sets of graduations for indicating the amount of said forces, said means including a shaft on which said pointer is fixedly mounted, a pinion fixed to said shaft, a rotatable gear segment meshing with said pinion and a slidable rod operatively connected with said segment and operable by one of the sides of said spring member upon compression of the same.

3. In a dynamometer, the combination of an elliptical spring member fitted for draft attachment at its opposite ends, a hand grip mounted on each of the respective sides of said spring member and extending therefrom, a dial plate having sets of graduations thereon, one set calibrated to indicate a pulling force and the other set calibrated to indicate a pushing force, a pointer common to both of said sets of graduations, and means connecting said spring member and pointer operable by a pulling force applied to the ends of said spring member or a pushing force applied to the sides of said spring member for actuating said pointer for co-action with the respective sets of graduations for indicating the amount of said forces.

4. In a dynamometer, the combination of an elliptical spring member, a dial plate having a scale calibrated thereon, means for rigidly anchoring one of the bowed sides of said spring member to said dial plate, a shaft journalled in said dial plate, a pointer fixedly mounted on one end of said shaft, and means connecting said spring member and pointer operable by the opposite sides of said spring member when a tensile force is applied to the ends of said elliptical spring member for imparting rotation to said shaft to cause said pointer to move about said dial plate for co-action with the graduations thereon.

5. In a dynamometer, the combination of an elliptical spring member, a dial plate having a scale calibrated thereon, means for rigidly anchoring one of the bowed sides of said spring member to said dial plate, a shaft journalled in said dial plate, a pointer fixedly mounted on one end of said shaft, and means connecting said spring member and pointer operable by the opposite sides of said spring member when a tensile force is applied to the ends of said elliptical spring member for imparting rotation to said shaft to cause said pointer to move about said dial plate for co-action with the graduations thereon, and means for adjusting the normal position of said pointer with respect to the graduations on said dial plate.

6. A dynamometer comprising a dial plate having graduations thereon, a casing supported upon the rear face of said dial plate, a shaft journalled in said casing, a pointer fixed to one end of said shaft for co-action with the graduations on said dial plate, a pinion fixed to the other end of said shaft and disposed within said casing, an elliptical spring member, means for anchoring one of the bowed sides of said spring member to said casing, a rod slidably mounted in one of the walls of said casing, an adjustable member carried by the other bowed side of said spring member for engagement with the outer end of said rod, a gear segment rotatably mounted in said casing and meshing with said pinion, an arm carried by the inner end of said rod, and a link connected with said arm and eccentrically connected with said gear segment, substantially as and for the purpose specified.

7. A dynamometer comprising a dial plate having graduations thereon, a casing supported upon the rear face of said dial plate, a shaft journalled in said casing, a pointer fixed to one end of said shaft for co-action with the graduations on said dial plate, a pinion fixed to the other end of said shaft and disposed within said casing, an elliptical spring member, means for anchoring one of the bowed sides of said spring member to said casing, a rod slidably mounted in one of the walls of said casing, an adjustable member carried by the other bowed side of said spring member for engagement with the outer end of said rod, a gear segment rotatably mounted in said casing and meshing with said pinion, an arm carried by the inner end of said rod, a link connected with said arm and eccentrically connected with said gear segment, and an adjustable stop co-acting with a pin on said segment for limiting the movement of said segment in one direction for accurately setting said pointer with respect to the graduations on said dial, substantially as and for the purpose specified.

In testimony whereof I have affixed my signature.

FRANZ FABER.